Nov. 19, 1940.   V. S. LARIONOFF-ROMANOVSKY   2,222,261

POWER TRANSMITTING MECHANISM

Filed July 9, 1940

VLADIMIR S. LARIONOFF-ROMANOVSKY

INVENTOR.

BY John P. Mironow

ATTORNEY

Patented Nov. 19, 1940

2,222,261

UNITED STATES PATENT OFFICE 2,222,261

POWER TRANSMITTING MECHANISM

Vladimir S. Larionoff-Romanovsky,
Philadelphia, Pa.

Application July 9, 1940, Serial No. 344,484

6 Claims. (Cl. 74—29)

My invention relates to power transmitting mechanisms and has particular reference to mechanisms for converting continuous auto intermittent rotation.

My invention has for its object to provide a mechanism for converting a continuous rotation as provided by a suitable motor into a reciprocating or intermittent rotation, such as is required for various industrial applications, such as driving pumps, compressors, etc.

Another object of my invention is to provide a mechanism for converting a continuous rotation into a similar rotation of a different angular velocity and simultaneously into a reciprocating motion.

Figure 1:
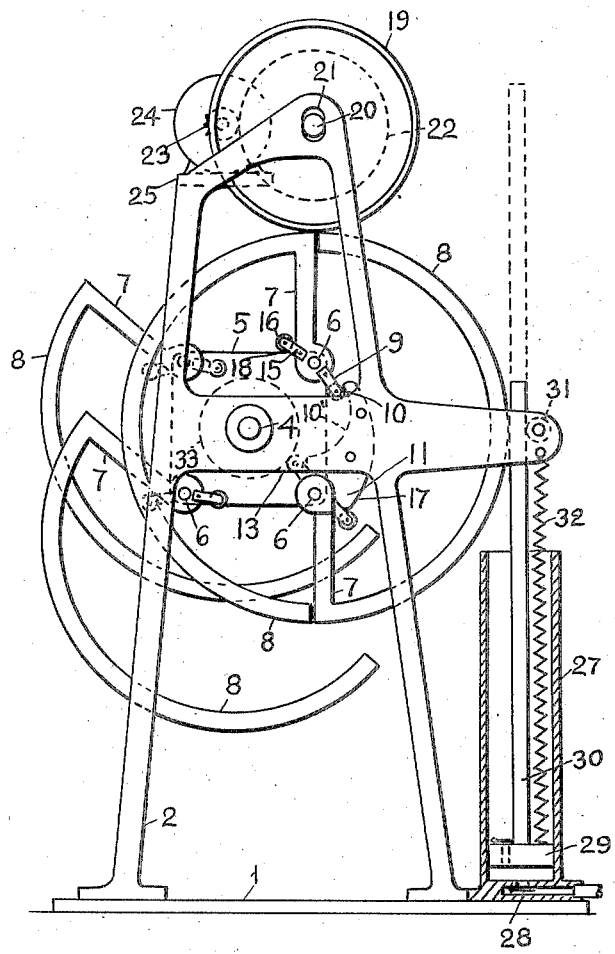
Figure 2:
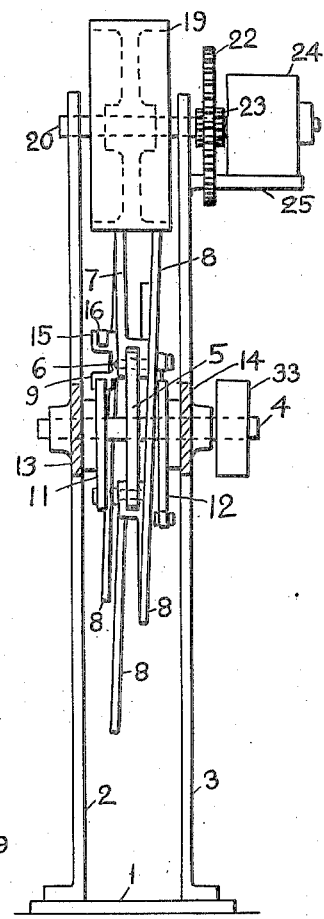

My invention is more fully described in the accompanying specification and drawing in which:

Fig. 1 is an elevational view of my mechanism;
Fig. 2 is a side view of the same.

My mechanism consists of a base 1 with brackets 2 and 3 with bearings for a shaft 4. The latter carries a plate or hub 5 having a plurality of pivots 6, four of which are shown in the particular construction illustrated, the pivots being equally spaced around the hub and at equal distances from the axis of the shaft 3. Arms 7 are rotatively mounted on the pivots 6, the outer ends of the arms being integrally connected to arcuate operating members 8, which, for convenience, will be hereinafter called "sectors." The outer portions of the sectors extend to about 180° and are curved so that two opposite sectors can form a ring. Lugs 9 extend outward from the inner ends of the arms 7 and are provided with rollers 10 adapted to engage inner concave surfaces 10' of cam plates 11 and 12. Two such plates are provided at the opposite sides of the hub 5, since the arms 7 are mounted at the alternate sides of the hub 5. The cam plates are rigidly fastened to the inner sides of bridges 13 and 14 forming a part of brackets 2 and 3.

Additional lugs 15 extend inward from the inner ends of the arms 7 and are provided with rollers 16 adapted to engage outer convex surfaces 17 of the cam plates 11 and 12. The inward lugs 15 have shoulders 18 which rest on the sides of the hub plate 5 in their upper position, thereby causing the corresponding arms 7 to rise into a vertical position as shown in Fig. 1. The corresponding sector 8 is then forced to frictionally engage the surface of a driving wheel 19 mounted on a shaft 20 rotatively supported in bearings 21 in the brackets 2 and 3. The bearing holes are elongated in the vertical direction so as to allow the wheel 19 to rest on the peripheral portions of the sectors. The shaft 20 has a gear 22 in mesh with a pinion 23 on the end of the shaft of an electric motor 24 mounted on a shelf 25 extending from the bracket 3.

The rotation is counterclockwise for the wheel 19 and clockwise for the sectors. The operative contact between the upper sector and the wheel 19 continues for some time due to the provision of the shoulders 18, until the roller 10 engages the concave surface 11 or 12, the curvature of the cam plate being such as to retain the sector in its arcuate position concentric with the axis of rotation lying on a vertical line passing through the center of the shaft 20. The concave portion of the cam plate will cause the arm 7 to turn on the pivot 6 until the inner roller 16 engages the convex surface 17 of the cam plate 11 or 12. The positive engagement of the rollers is so arranged that the sector describes an arc of 180°. The sector in this position, being in a fixed cooperative position with the driving wheel 19, can be used for transmitting power of the motor. The power, however, can be transmitted only as long as the roller 16 engages the cam plate 11 or 12. The sectors, therefore, can be used for transmitting an intermittent rotation, as, for instance, for operating a pump or compressor as shown in Fig. 1.

The compressor comprises a cylinder 27 mounted on the base 1 and having an exhaust valve 28 in the head. A piston 29 slides in the cylinder and is provided with a rod 30 frictionally engaging the periphery of the sector 8. A roller 31 retains the rod in engagement with the sector. A retrieving spring 32 returns the piston upward when the sector becomes inoperative by reason of the roller 16 being disengaged from the cam plate.

The shaft 4 is provided with a pulley 33 for transmitting continuous rotation, as, for instance, for operating a machine shop.

The stroke of the pump may be varied by inclining the axis of the cylinder to the right or to the left, i. e., by causing a shorter or longer arc of the sector 8 to operate the rod 30.

The sectors, wheel 19 and the rod 30, may be provided with teeth or roughened surface for a positive mutual engagement. The pump may be of any suitable type and may comprise two cylinders and two pistons, operated alternately by the alternate sectors.

It is understood that my power transmitting mechanism may be further modified without departing from the spirit of the invention, as set forth in the appended claims.

I claim as my invention:

1. A power transmitting mechanism comprising a base, brackets on the base, a shaft journaled in the brackets, a hub on the shaft, a plurality of pivots equally spaced at the periphery of the hub at equal distances from the axis of the shaft, arms rotatively supported on the pivots, arcuate sectors extending from the outer ends of the arms, cam members supported at the sides of the hub, lugs extending from the inner ends of the arms adapted to slidably engage the cam members, thereby holding the respective sector in an operative position, a rotary member rotatively supported in the upper portions of the brackets adapted to slide in a vertical direction and to rest on the sectors passing thereunder, means to rotate the rotary member, thereby causing alternate sectors to successively engage the rotary member, and means to transmit intermittent motion from the successive sectors during the time they are operative.

2. A power transmitting mechanism comprising a base, brackets on the base, a shaft journaled in the brackets, a hub on the shaft, a plurality of pivots equally spaced at the periphery of the hub at equal distances from the axis of the shafts, arms rotatively supported on the pivots, arcuate sectors extending from the outer ends of the arms, cam members supported at the sides of the hub, lugs extending from the inner ends of the arms adapted to slidably engage the cam members, thereby holding the respective sector in an operative position, a rotary member rotatively supported in the upper portions of the brackets adapted to slide in a vertical direction and to rest on the sectors passing thereunder, means to rotate the rotary member, thereby causing alternate sectors to successively engage the rotary member, a rod adapted to be operatively connected to the sector in its operative position for moving the rod in direction of rotation of the sector, means to produce a useful work by the rod, and a retrieving means for returning the rod into its original position.

3. A power transmitting mechanism comprising a base, brackets on the base, a shaft journaled in the brackets, a hub on the shaft, a plurality of pivots equally spaced at the periphery of the hub at equal distances from the axis of the shaft, arms rotatively supported on the pivots, arcuate sectors extending from the outer ends of the arms, cam members supported at the sides of the hub, lugs extending from the inner ends of the arms adapted to slidably engage the cam members, thereby holding the respective sector in an operative position, a rotary member rotatively supported in the upper portions of the brackets adapted to slide in a vertical direction and to rest on the sectors passing thereunder, means to rotate the rotary member, thereby causing alternate sectors to successively engage the rotary member, a rod adapted to be operatively connected to the sector in its operative position for moving the rod in direction of rotation of the sector, a plunger at the end of the rod, a cylinder housing the plunger, and means to displace a fluid by the plunger in the cylinder when the rod is moved by the sector.

4. A power transmitting mechanism comprising a base, brackets on the base, a shaft journaled in the brackets, a hub on the shaft, a plurality of pivots equally spaced at the periphery of the hub at equal distances from the axis of the shaft, arms rotatively supported on the pivots at the alternate sides of the hub, arcuate sectors integrally extending from the arms, the outer portions of the sector diverging from the plane of the hub, cam members supported on the brackets opposite the sides of the hub, lugs extending from the arms, rollers on the lugs adapted to slidably engage the respective cam members for holding the respective sectors in an operative position, a rotary member rotatively supported in the upper portions of the brackets adapted to slide in a vertical direction and to rest on the sectors passing thereunder, means to rotate the rotary member, thereby causing alternate sectors to successively engage the rotary member, and means to transmit intermittent motion from the successive sectors during the time they are operative.

5. A power transmitting mechanism comprising a base, brackets on the base, a shaft journaled in the brackets, a hub on the shaft, a plurality of pivots equally spaced at the periphery of the hub at equal distances from the axis of the shaft, arms rotatively supported on the pivots at the alternate sides of the hub, arcuate sectors integrally extending from the arms, the outer portions of the sector diverging from the plane of the hub, cam members supported on the brackets opposite the sides of the hub, lugs extending from the arms, rollers on the lugs adapted to slidably engage the respective cam members for holding the respective sectors in an operative position, a rotary member rotatively supported in the upper portions of the brackets adapted to slide in a vertical direction and to rest on the sectors passing thereunder, means to rotate the rotary member, thereby causing alternate sectors to successively engage the rotary member, the sector in its operative position being concentric with an axis positioned on a vertical line passing through the center of the rotary member, and means to transmit intermittent motion from the successive sectors during the time they are operative.

6. A power transmitting mechanism comprising a base, brackets on the base, a shaft journaled in the brackets, a hub on the shaft, a plurality of pivots equally spaced at the periphery of the hub at equal distances from the axis of the shaft, arms rotatively suppported on the pivots, arcuate sectors extending from the outer ends of the arms, a rotary member rotatively supported in the upper portions of the brackets adapted to slide in a vertical direction so as to rest on the sectors passing thereunder, means to rotate the rotary member, thereby causing rotation of the sectors and of the hub, means on the brackets for guiding the sectors in their operative position when they pass under the rotary member, so as to maintain each passing sector in a positive contact with the rotary member, and means to successively and intermittently transmit motion from the successive sectors when they are in the operative position.

VLADIMIR S. LARIONOFF-ROMANOVSKY.